United States Patent
Usui et al.

(10) Patent No.: US 7,215,093 B2
(45) Date of Patent: May 8, 2007

(54) MOTOR DRIVE CIRCUIT AND MOTOR DRIVE METHOD THAT CAN POSITIVELY PERFORM A BRAKE OPERATION

(75) Inventors: Kaoru Usui, Atsugi (JP); Tomomitsu Oohara, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/789,223

(22) Filed: Feb. 27, 2004

(65) Prior Publication Data

US 2004/0178755 A1 Sep. 16, 2004

(30) Foreign Application Priority Data

Mar. 14, 2003 (JP) ............................. 2003-070554

(51) Int. Cl.
*H02K 7/00* (2006.01)
*H02P 3/00* (2006.01)

(52) U.S. Cl. ............... 318/362; 318/432; 318/434; 318/273; 318/703; 318/363; 318/373; 318/376

(58) Field of Classification Search ........ 318/432–434, 318/362–368, 373–376, 273, 703
See application file for complete search history.

(56) References Cited

U.S. PATENT DOCUMENTS

| 4,477,751 | A | * | 10/1984 | Kanayama | 318/280 |
| 4,581,565 | A | * | 4/1986 | Van Pelt et al. | 318/294 |
| 4,816,726 | A | * | 3/1989 | Novis et al. | 318/293 |
| 4,901,366 | A | * | 2/1990 | Rottger | 388/811 |
| 4,985,666 | A | * | 1/1991 | Nakabayashi | 318/434 |
| 5,303,156 | A | * | 4/1994 | Matsuoka et al. | 701/43 |
| 5,631,528 | A | * | 5/1997 | Agiman | 318/293 |
| 5,682,314 | A | * | 10/1997 | Nishino et al. | 701/29 |
| 6,072,292 | A | * | 6/2000 | Uchiyama et al. | 318/376 |
| 6,864,651 | B1 | * | 3/2005 | Lee et al. | 318/280 |

(Continued)

FOREIGN PATENT DOCUMENTS

JP          05161390          6/1993

(Continued)

OTHER PUBLICATIONS

IBM Techinical Disclosure Bullet, Oct. 1991, vol. 34, Issue 5, pp. 27-30, "Brake Control Method for DC Motor", NN911027.*

(Continued)

*Primary Examiner*—Lincoln Donovan
*Assistant Examiner*—Tyrone Smith
(74) *Attorney, Agent, or Firm*—Anderson Kill & Olick; Eugene Lieberstein (57) ABSTRACT

A motor drive circuit includes a first transistor. The collector of a second transistor is connected to the emitter of the first transistor in series. A motor is connected to a connection point between the first and second transistors. A first brake control circuit turns off the first transistor and turns on the second transistor in accordance with a brake operation instruction signal. A second brake control circuit forces the first transistor to be turned OFF in accordance with the brake operation instruction signal independently from the first brake control circuit.

12 Claims, 6 Drawing Sheets

U.S. PATENT DOCUMENTS 6,975,083 B2 * 12/2005 Flock ................... 318/254

FOREIGN PATENT DOCUMENTS

| JP | 05-219790 | 8/1993 |
|----|-----------|--------|
| JP | 07045826 | 2/1995 |
| JP | 07235601 | 9/1995 |
| JP | 08154396 | 6/1996 |
| JP | 11235084 | 8/1999 |
| JP | 2001-339986 | 12/2001 |

OTHER PUBLICATIONS

Office Action which issued in the corresponding Chinese Application No. 2004/100393543, citing the above reference.

* cited by examiner

MOTOR DRIVE CIRCUIT AND MOTOR DRIVE METHOD THAT CAN POSITIVELY PERFORM A BRAKE OPERATION

BACKGROUND OF THE INVENTION

1. Field of the Invention

The present invention relates to motor drive circuits and motor drive methods, and more particularly, to a motor drive circuit having a short brake function and a motor drive method capable of performing a short brake operation.

2. Description of the Related Art

Motor drive circuits are circuits that supply a drive current to a motor for rotating the motor. In such a motor drive circuit, when the supply of the drive current to the motor is stopped in a state where the drive current is supplied to the motor and the motor is being rotated, the motor tries to continue rotating itself by inertia. When the motor is rotated by inertia, a counter electromotive force is generated in the motor in accordance with the rotation. The counter electromotive force generated in the motor is applied to the motor drive circuit. Accordingly, the longer the time interval of rotation of the motor is and the faster the rotation is, the longer the time interval of application of the counter electromotive force becomes and the greater the counter electromotive force becomes.

Motor drive circuits are circuits for supplying a drive current to a motor. Thus, when a counter electromotive force is applied to a motor drive circuit by a motor, there is a possibility of a malfunction. In order to avoid such a malfunction, some motor drive circuits are provided with a brake function that forces the motor to stop rotating.

The brake function of a motor drive circuit includes a function referred to as short brake. Short brake is a function that, when the supply of a drive current from a motor drive circuit to a motor is stopped, brakes the motor by forming a loop connecting both poles of the motor and regenerating a current generated by a counter electromotive force.

Figure 1:
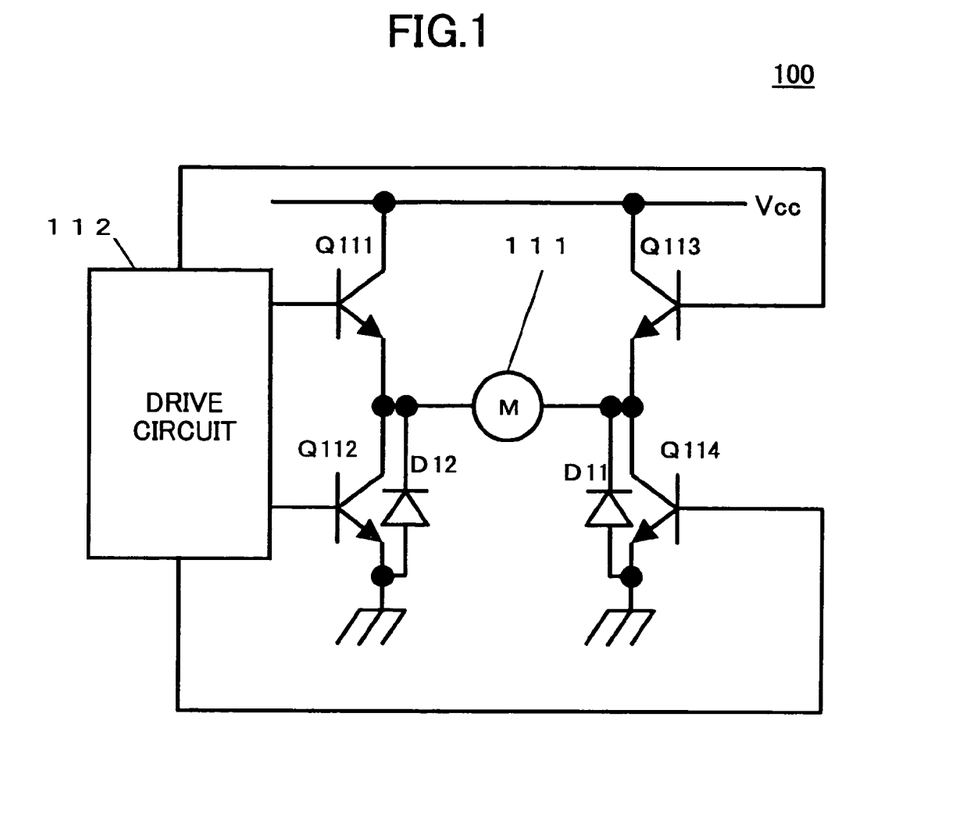
FIG. 1 is a block diagram of a motor drive circuit.

FIG. 1 is a block diagram of a motor drive circuit.

A motor drive circuit 100 shown in FIG. 1 has an H bridge circuit configuration and includes a drive circuit 112 and output transistors Q111 through Q114.

The emitter of the output transistor Q111 and the collector of the output transistor Q112 are connected in series between a power supply voltage Vcc and the ground. The emitter of the output transistor Q113 and the collector of the output transistor Q114 are connected in series between the power supply voltage Vcc and the ground. Switching control is performed on the output transistors Q111 through Q114 by the drive circuit 112.

When a motor 111 is to be rotated in the right direction, the output transistors Q111 and Q114 are turned ON and the output transistors Q113 and Q112 are turned OFF by the drive circuit 112. On the other hand, when the motor 111 is to be rotated in the reversed direction, the output transistors Q113 and Q112 are turned ON and the output transistors Q111 and Q114 are turned OFF by the drive circuit 112 (refer to Japanese Laid-Open Patent Application No. 8-154396, for example).

In conventional motor drive circuits, the output transistor Q111 is turned OFF and the output transistor Q112 is turned ON at the time of short brake. On this occasion, the potential of a connection point between the output transistors Q111 and Q112 is increased by a counter electromotive force generated in the motor 111. When the potential of the connection point between the output transistors Q111 and Q112 is increased, the timing at which the output transistor Q111 is turned OFF is delayed compared to the timing at which the output transistor Q112 is turned ON. Consequently, a time interval occurs during which the output transistors Q111 and Q112 are simultaneously ON.

When the output transistors Q111 and Q112 are simultaneously ON, a current flowing from a power supply to the ground via the output transistors Q111 and Q112, i.e., a shoot-through current, flows. When the time interval during which the shoot-through current flows through the output transistors Q111 and Q112 is long, there is a problem in that a malfunction occurs in the operation of the drive circuit 112, for example.

SUMMARY OF THE INVENTION

A general object of the present invention is to provide an improved and useful motor drive circuit and motor drive method in which one or more of the above-mentioned problems are eliminated.

A more specific object of the present invention is to provide a motor drive circuit and a motor drive method that can positively perform a brake operation.

In order to achieve the above-mentioned objects, according to one aspect of the present invention, there is provided a motor drive circuit including:

a first transistor;

a second transistor whose collector is connected to the emitter of the first transistor in series;

a motor connected to a connection point between the first and second transistors;

a first brake control circuit that turns off the first transistor and turns on the second transistor in accordance with a brake operation instruction signal; and a second brake control circuit that forces the first transistor to be turned OFF in accordance with the brake operation instruction signal independently from the first brake control circuit.

Additionally, according to another aspect of the present invention, there is provided a motor drive method applied to a motor drive circuit in which a motor is connected to a connection point between a first transistor and a second transistor, and the emitter of the first transistor and the collector of the second transistor are connected in series, the motor drive method including the steps of:

turning OFF the first transistor and turning ON the second transistor in accordance with a brake operation instruction signal; and forcing the first transistor to be turned OFF in accordance with the brake operation instruction signal.

According to the present invention, among a pair of transistors, one of the transistors is turned OFF and the other of the transistors is turned ON in accordance with a brake operation instruction signal, and the other of the transistors is forced to be turned OFF. Thus, it is possible to turn OFF the transistor at high speed. Accordingly, it is possible to reduce the time interval during which the pair of transistors are simultaneously ON. Thus, since it is thus possible to reduce the time interval during which a shoot-through current flows through the pair of transistors, it is possible to positively perform a brake operation and the like.

Other objects, features and advantages of the present invention will become more apparent from the following detailed description when read in conjunction with the following drawings.

DETAILED DESCRIPTION OF THE PREFERRED EMBODIMENTS

Figure 2:
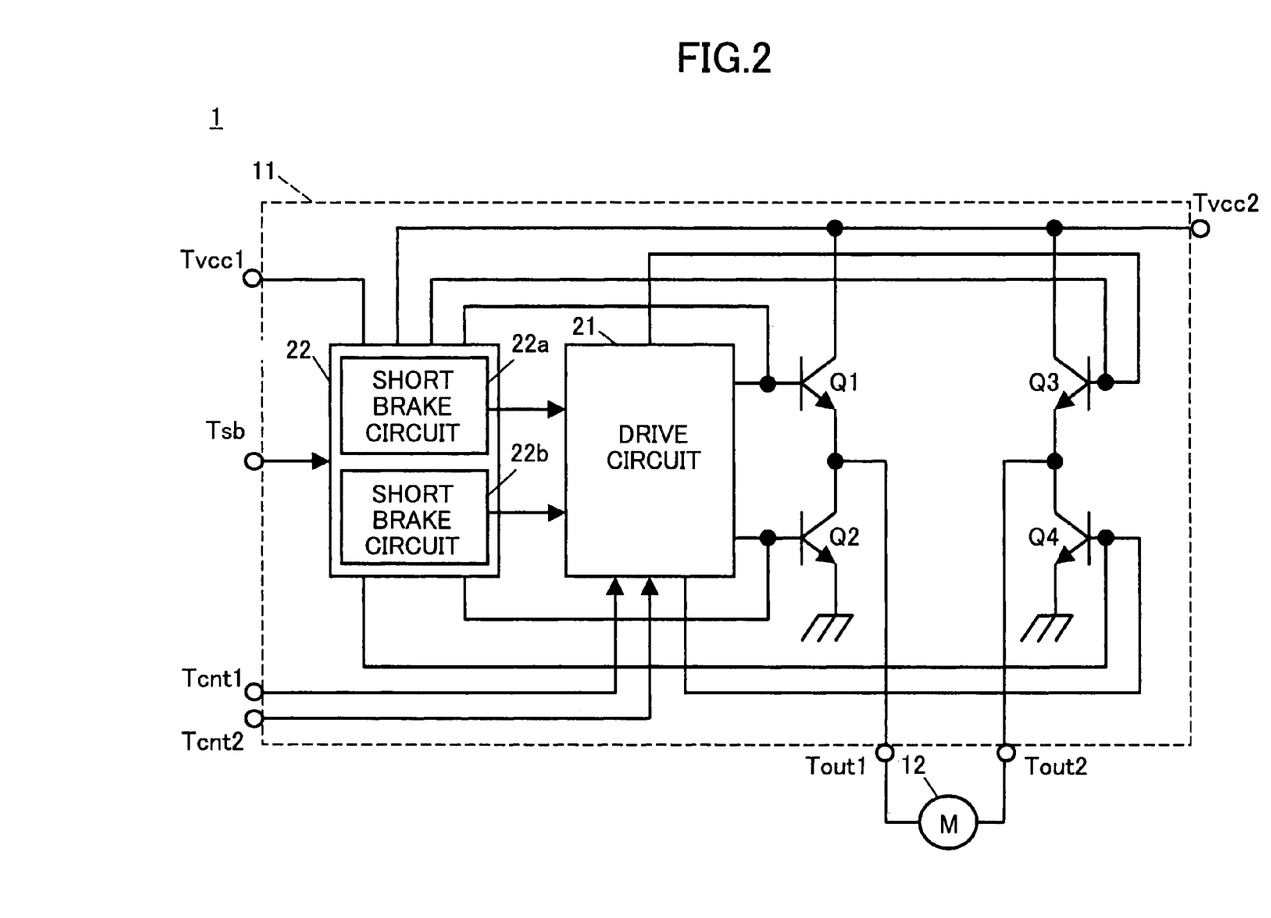
FIG. 2 is a system block diagram of a motor drive system according to one embodiment of the present invention.

FIG. 2 is a system block diagram of a motor drive system 1 according to one embodiment of the present invention.

The motor drive system 1 of this embodiment is a system for driving a direct current motor 12 and includes a motor driving IC 11 and the direct current motor 12.

The motor driving IC 11 includes a drive circuit 21, a short brake circuit 22, and output transistors Q1 through Q4. The motor driving IC 11 also includes, as outside terminals, at least power supply terminals Tvcc1 and Tvcc2, output terminals Tout1 and Tout2, control terminals Tcnt1 and Tcnt2, and a short brake terminal Tsb.

A power supply voltage Vcc1 is applied to the power supply terminal Tvcc1, and a power supply voltage Vcc2 is applied to the power supply terminal Tvcc2. The direct current motor 12 is connected between the output terminals Tout1 and Tout2. A rotation control signal is supplied to the control terminal Tcnt1 from a microcomputer, for example. A rotation direction control signal is supplied to the control terminal Tcnt2 from the microcomputer, for example.

The drive circuit 21 controls the rotation direction and rotational speed of the direct current motor 12 by performing switching control of the output transistors Q1 through Q4 based on the rotation control signal and the rotation direction control signal supplied from the control terminals Tcnt1 and Tcnt2, respectively.

The output transistor Q1 is formed by an NPN transistor. When a drive signal from the drive circuit 21 is at a high level, the output transistor Q1 is ON and outputs a drive current from the power supply terminal Tvcc2 to the output terminal Tout1. When the drive signal from the drive circuit 21 is switched to a low level, the output transistor Q1 is turned OFF and stops outputting the drive current from the power supply terminal Tvcc2 to the output terminal Tout1. The output transistor Q2 is formed by an NPN transistor. When a drive signal from the drive circuit 21 is at a high level, the output transistor Q2 is ON and draws a drive current from the output terminal Tout1. When the drive signal from the drive circuit 21 is switched to a low level, the output transistor Q2 is turned OFF and stops drawing the drive current from the output terminal Tout1.

The output transistor Q3 is formed by an NPN transistor. When a drive signal from the drive circuit 21 is at a high level, the output transistor Q3 is ON and outputs a power supply current from the power supply terminal Tvcc2 to the output terminal Tout2. When the drive signal from the drive circuit 21 is switched to a low level, the output transistor Q3 is turned OFF and stops outputting the power supply current from the power supply terminal Tvcc2 to the output terminal Tout2. The output transistor Q4 is formed by an NPN transistor. When a drive signal from the drive circuit 21 is at a high level, the output transistor Q4 is ON and draws a drive current from the output terminal Tout2. When the drive signal from the drive circuit 21 is switched to a low level, the output transistor Q4 is turned OFF and stops drawing the drive current from the output terminal Tout2.

Figure 3:
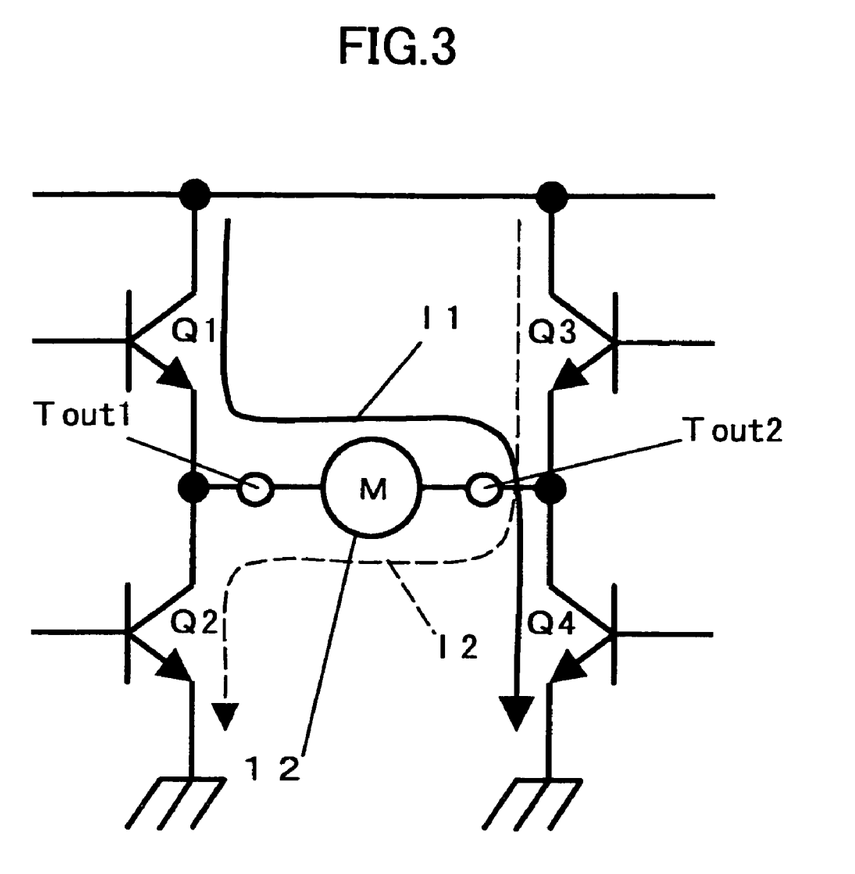
FIG. 3 is a schematic diagram for explaining normal operations.
Figure 4:
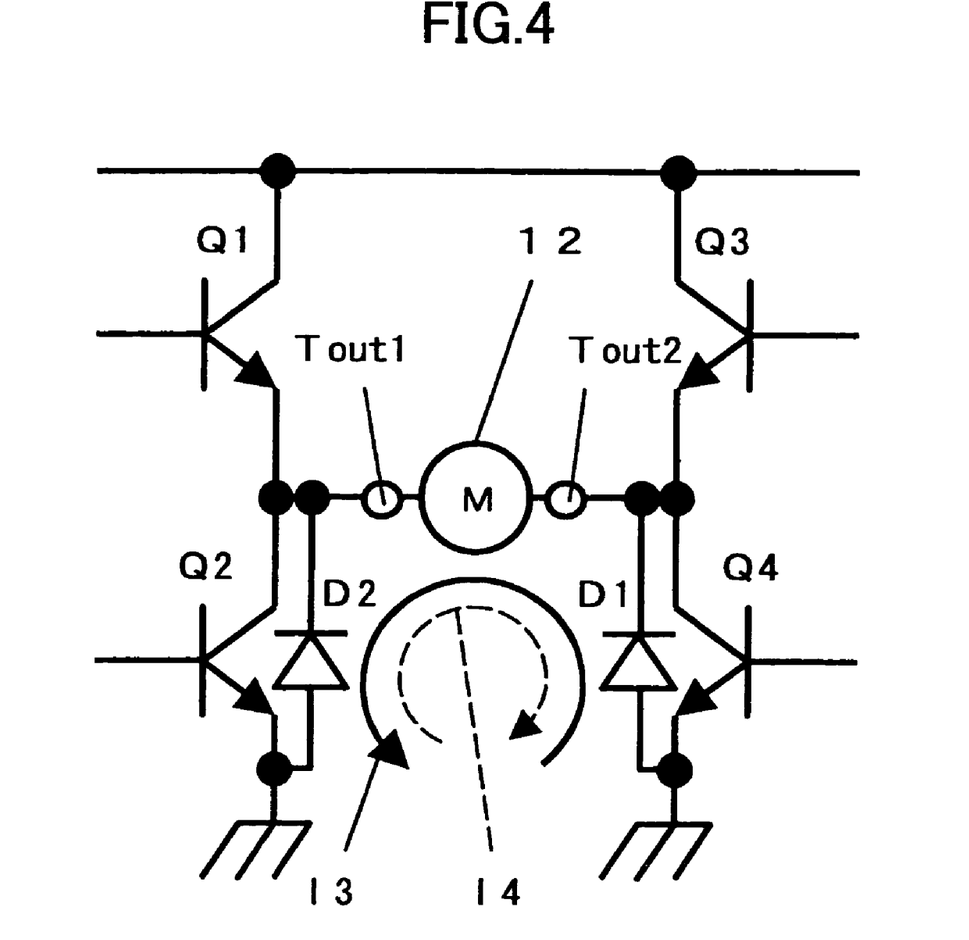
FIG. 4 is a schematic diagram for explaining short brake operations.

FIG. 3 is a schematic diagram for explaining normal operations. FIG. 4 is a schematic diagram for explaining short brake operations.

When the rotation control signal from the control terminal Tcnt1 indicates rotation in the right direction, the drive circuit 21 turns ON the output transistors Q1 and Q4 and turns OFF the output transistors Q2 and Q3. A drive current I1, which is indicated by a continuous line in FIG. 3, flows by turning ON the output transistors Q1 and Q4 and turning OFF the output transistors Q2 and Q3. A drive current I2, which is indicated by a broken line in FIG. 3, flows by turning ON the output transistors Q2 and Q3 and turning OFF the output transistors Q1 and Q4. The direct current motor 12 is rotated in the right direction by the drive current I1, and is rotated in the reversed direction by the drive current I2.

The short brake circuit 22 includes a short brake circuit 22a for rotation in the right direction and a short brake circuit 22b for rotation in the reversed direction. At the time of rotation in the right direction, the short brake circuit 22a is operated. When a short brake signal from the short brake control terminal Tsb indicates short brake, the short brake circuit 22a controls the drive circuit 21 such that the output transistor Q1 is turned OFF, and supplies a current to the base of the output transistor Q2 so that the output transistor Q2 is turned ON and a loop current I3, which is indicated by a continuous line in FIG. 4, flows via a parasitic diode D1 formed in parallel with the output transistor Q4. Short brake is applied to the direct current motor 12 by the loop current I3.

It should be noted that the short brake circuit 22a of this embodiment is configured to forcibly draw a current from the base of the output transistor Q1, when short brake is applied, so as to reduce the time interval until the output transistor Q1 is turned OFF.

When the short brake control signal from the short brake control terminal Tsb indicates short brake, the short brake circuit 22b controls the drive circuit 21 such that the output transistor Q3 is turned OFF and supplies a current to the base of the output transistor Q4 so that the output transistor Q4 is turned ON and a loop current I4, which is indicated by a broken line in FIG. 4, flows via a parasitic diode D2. Short brake is applied to the direct current motor 12 by the loop current I4.

It should be noted that the short brake circuit 22b of this embodiment is configured to forcibly draw a current from the base of the output transistor Q3, when short brake is applied, so as to reduce the time interval until the output transistor Q3 is turned OFF.

The configuration of the short brake circuit 22a and that of the short brake circuit 22b are the same. Thus, here, the description is given only of the short brake circuit 22a.

Figure 5:
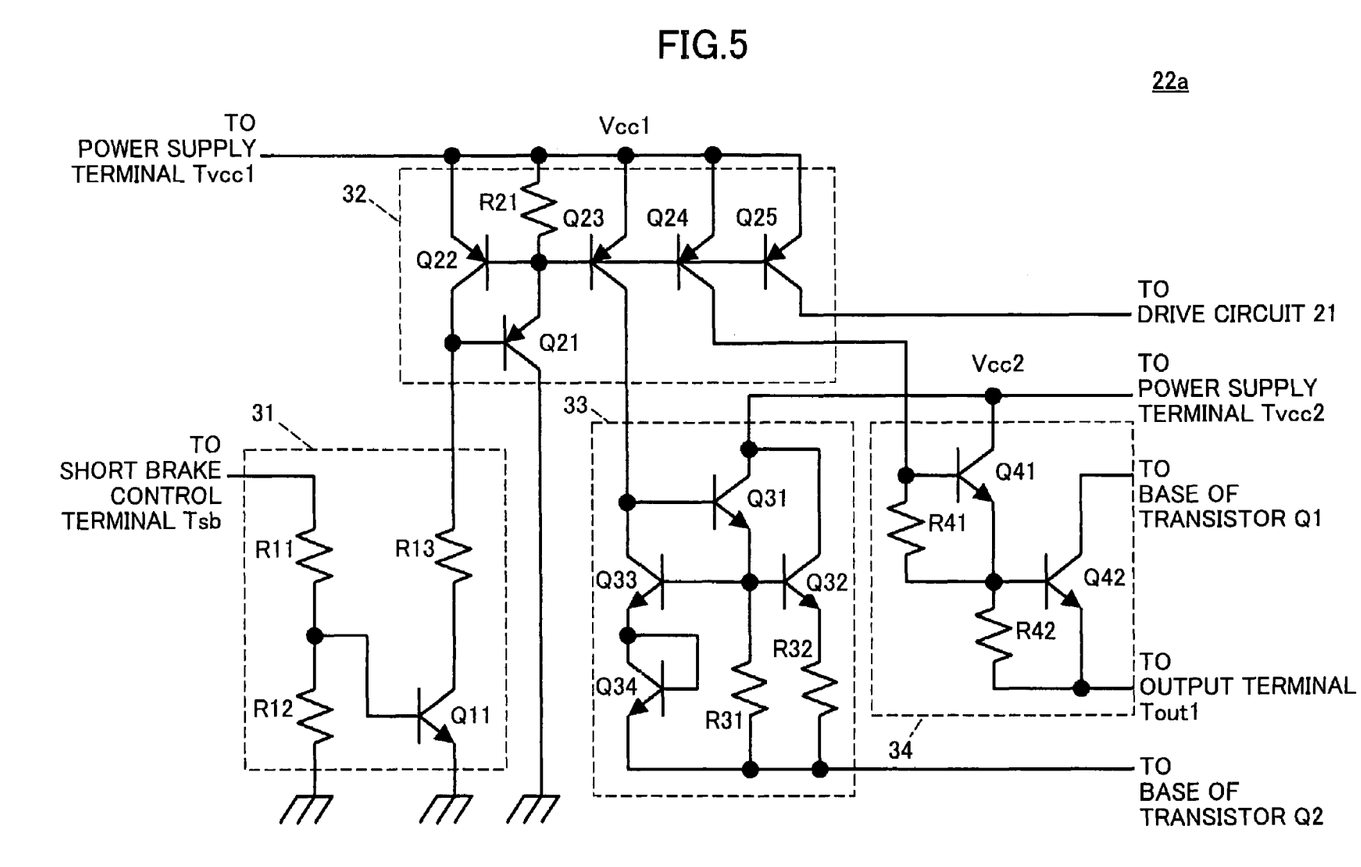
FIG. 5 is a circuit diagram of a short brake circuit.

FIG. 5 is a circuit configuration diagram of the short brake circuit 22a.

The short brake circuit 22a includes an input circuit 31, a current supply circuit 32, a current output circuit 33, and a current draw circuit 34.

The input circuit 31 includes resistances R11 through R13 and a transistor Q11. The resistances R11 and R12 are connected in series between the short brake control terminal Tsb and the ground. The resistances R11 and R12 divide the short brake control signal supplied to the short brake control terminal Tsb. The connection point between the resistances R11 and R12 is connected to the base of the transistor Q11.

The transistor Q11 is formed by an NPN transistor. The base of the transistor Q11 is connected to the connection point between the resistances R11 and R12. The emitter of the transistor Q11 is grounded, and the collector thereof is connected to an end of the resistance R13. The transistor Q11 is switched depending on the potential of the connection point between the resistances R11 and R12, i.e., the short brake control signal. When the short brake control signal is switched to a high level, the transistor Q11 is turned ON, a current is drawn through the collector, and the collector potential is lowered. When the short brake control signal is switched to a low level, the transistor Q11 is turned OFF, flow of the current is cut off, and the collector potential is raised.

An end of the resistance R13 is connected to the collector of the transistor Q11, and the other end thereof is connected to the current supply circuit 32. The resistance R13 limits a current drawn from the current supply circuit 32.

The current supply circuit 32 includes transistors Q21 through Q25 and a resistor R21, and constitutes a so-called current mirror circuit. The base of the transistor Q21 and the collector of the transistor Q22 are connected to the other end of the resistance R13 of the input circuit 31. The transistor Q21 is formed by a PNP transistor. When the transistor Q11 of the input circuit 31 is turned ON and a current is drawn through the base of the transistor Q21, the transistor Q21 is turned ON and draws a current from the bases of the transistors Q22 through Q25.

The transistors Q22 through Q25 are each formed by a PNP transistor. When the transistor Q21 is turned on, a current is drawn through the base thereof, and the base potential is lowered, the transistors Q22 through Q25 are turned ON. A current substantially the same as the current that flows into the collector of the transistor Q22 flows into the collectors of the transistors Q23 through Q25.

On this occasion, a current I11 that flows through the resistance R13, i.e., the current I11 that flows through the transistors Q22 through Q25, is obtained by $$I11=(Vcc1-Vceq11-Vceq22)/R13$$

where the collector-emitter voltage of the transistor Q11 is Vceq11 and the collector-emitter voltage of the transistor Q22 is Vceq22.

The collector current of the transistor Q23 is supplied to the current output circuit 33.

The current output circuit 33 includes transistors Q31 through Q34 and resistances R31 and R32, and constitutes a constant current circuit.

The transistor Q31 is formed by an NPN transistor. The collector current of the transistor Q23 of the current supply circuit 32 is supplied to the base of the transistor Q31. The power supply voltage Vcc2 is applied to the collector of the transistor Q31 from the power supply terminal Tvcc2. The emitter of the transistor Q31 is connected to the bases of transistors Q32 and Q33. The transistor Q31 controls the base potentials of the transistors Q32 and Q33 together with the resistance R31. When a current is supplied to the transistor Q31 from the transistor Q23 of the current supply circuit 32, the transistor Q31 is turned ON and raises the base potentials of the transistors Q32 and Q33.

The transistors Q32 and Q33 are each formed by an NPN transistor. When the transistor Q31 is turned ON and the base potentials of the transistors Q32 and Q33 are raised by the emitter current of the transistor Q31, the transistors Q32 and Q33 are turned ON. The transistor Q32 outputs a current corresponding to the emitter current of the transistor Q33 as the emitter current thereof. The output current of the transistor Q32 is supplied to the base of the output transistor Q2 via the resistance R32.

The transistor Q34 is connected between the emitter of the transistor Q33 and the base of the transistor Q2 in the forward direction to make a diode connection. The transistor Q34 reduces a leakage current and prevents a reversed current from the base of the output transistor Q2 from flowing.

On this occasion, a current I12 supplied to the base of the transistor Q2 from the current supply circuit 32 is represented by $$I12=I11+\{(Vbeq34+V\cdot ln10)/R32\}$$

where the base-emitter voltage of the transistor Q34 is Vbeq34, the current gain of the transistor Q32 is 10, and a thermal voltage is VT.

The collector current of the transistor Q24 of the current supply circuit 32 is supplied to the current draw circuit 34. The current draw circuit 34 includes transistors Q41 and Q42 and resistances R41 and R42.

The collector current of the transistor Q24 is supplied to the resistance R41. The resistance R41 is connected between the base and the emitter of the transistor Q41. The resistance R41 reduces a leakage current and generates a voltage in accordance with the collector current of the transistor Q24.

The transistor Q41 is formed by an NPN transistor. The resistance R41 is connected between the base and the emitter of the transistor Q41. The power supply voltage Vcc2 is applied to the collector of the transistor Q41. When a voltage is generated across the resistance R41 by a current from the transistor Q24 and becomes greater than the ON voltage, the transistor Q41 is turned ON.

When the transistor Q41 is turned ON, the emitter current thereof is output. The emitter current of the transistor Q41 is supplied to the base of the transistor Q42.

The transistor Q42 is formed by an NPN transistor. The collector of the transistor Q42 is connected to the base of the output transistor Q1. The emitter of the transistor Q42 is connected to the output terminal Tout1. The resistance R42 is connected between the base and the emitter of the transistor Q42. The resistance R42 reduces a leakage current and generates a voltage by the flow of the emitter current of the transistor Q41. When the voltage is generated across the resistance R42 by the emitter current of the transistor Q41 and becomes greater than the ON voltage, the transistor Q42 is turned ON. When the transistor Q42 is turned ON, a current is drawn through the collector of the transistor Q42.

Next, a description is given below of operations of the short brake circuit 22a.

Figure 6:
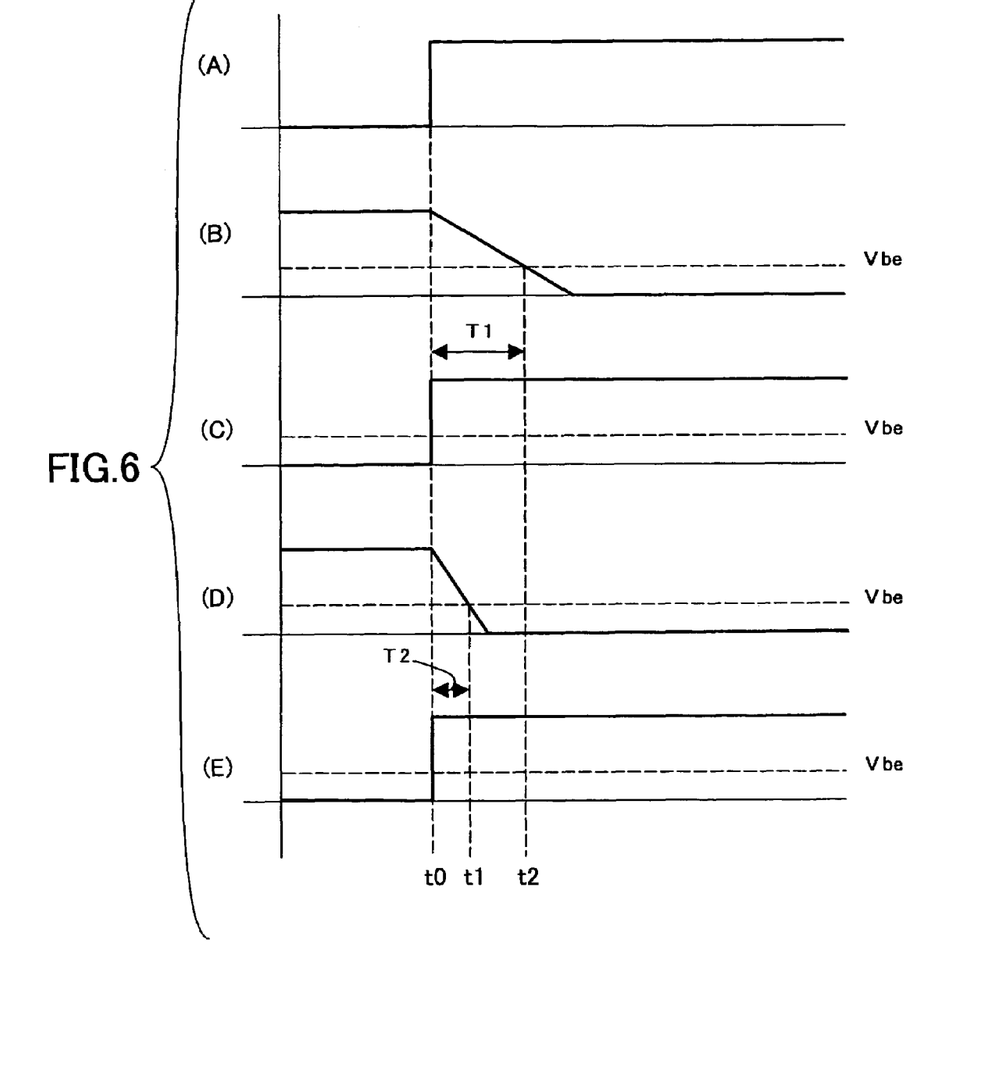
FIG. 6 is an operational waveform chart of the short brake circuit.

FIG. 6 is a schematic diagram showing operational waveforms of the short brake circuit 22a. FIG. 6-(A) represents a short brake control signal supplied to the short brake control terminal Tsb. FIG. 6-(B) represents the base potential of the output transistor Q1 without the current draw circuit 34. FIG. 6-(C) represents the base potential of the transistor Q2 without the current draw circuit 34. FIG. 6-(D) represents the base potential of the transistor Q1 with the current draw circuit 34. FIG. 6-(E) represents the base potential of the transistor Q2 with the current draw circuit 34. In FIG. 6, Vbe represents the OFF voltage (the voltage at which the transistor Q1 is turned OFF) of the output transistor Q1.

As shown in FIG. 6-(A), at time t0, when the short brake control signal supplied to the short brake control terminal Tsb reaches a high level, a current is supplied to the current output circuit 33 from the current supply circuit 32, and the drive current is supplied to the base of the transistor Q2 from the current output circuit 33. Hence, as shown in FIG. 6-(E), the transistor Q2 is turned ON at once. In addition, the drive circuit 21 lowers the base potential of the transistor Q1 based on the current from the transistor Q25 of the current supply circuit 32. On this occasion, in this embodiment, a current is forced to be drawn by the current draw circuit 34 through the base of the transistor Q1. Hence, as shown in FIG. 6-(D), the base potential of the transistor Q1 falls to the OFF voltage Vbe of the transistor Q1 at time t1 that is after a time interval T2 (=450 nsec) since the time t0.

On the other hand, when the current draw circuit 34 is not provided, the base potential falls only by a signal from the drive circuit 21. Hence, as shown in FIG. 6-(B), the base potential of the transistor Q1 reaches the OFF voltage Vbe after a time interval T1 (=2.5 μsec), which is longer than the time interval T2 (=450 nsec), since the time t0.

Therefore, according to this embodiment, compared to the case where the current draw circuit 34 is not provided, it is possible to reduce the time interval until the transistor Q1 is turned OFF for a time interval T1-2=(T1−T2).

Consequently, since the time interval during which both the transistors Q1 and Q2 are simultaneously ON is reduced, it is possible to reduce the time interval during which the shoot-through current flows through the transistors Q1 and Q2. Accordingly, it is possible to protect the transistors Q1 and Q2 from the shoot-through current.

In this embodiment, the description is given of the H bridge motor drive circuit capable of rotating the direct current motor 11 in the right and reversed directions. However, this is not a limitation, and the present invention may be generally applied to motor drive circuits having a short brake function, or a regenerative brake function.

As mentioned above, according to the present invention, among a pair of transistors, one of the transistors is turned OFF and the other of the transistors is turned ON in accordance with a brake operation instruction signal, and the other of the transistors is forced to be turned OFF. Thus, it is possible to turn OFF the transistor at a high speed. Accordingly, it is possible to reduce the time interval during which the pair of transistors are simultaneously ON. Thus, since it is possible to reduce the time interval during which a shoot-through current flows through the pair of transistors, it is possible to positively perform a brake operation and the like.

The present invention is not limited to the specifically disclosed embodiments, and variations and modifications may be made without departing from the scope of the present invention.

The present application is based on Japanese priority application No. 2003-070554 filed on Mar. 14, 2003, the entire contents of which are hereby incorporated by reference.

What is claimed is:

1. A motor drive circuit having a plurality of transistors, comprising:
   a first transistor;
   a second transistor whose collector is connected to an emitter of said first transistor in series;
   a motor connected to a connection point between said first and second transistors;
   a drive circuit connected to the base of each of said plurality of transistors to control said motor through said plurality of transistors; and
   a short brake circuit connected to said drive circuit and also to the base of each of said first and second transistors independent of said drive circuit,
   wherein said short brake circuit includes:
   a first brake control circuit that outputs a signal to said drive circuit so as to cause said drive circuit to turn off said first transistor and to turn on said second transistor in accordance with a brake operation instruction signal; and
   a second brake control circuit connected to the base of said first transistor so as to cause said first transistor to be turned off by drawing current from the base of said first transistor in accordance with said brake operation instruction signal independent of said first brake control circuit.

2. The motor drive circuit as claimed in claim 1, wherein the first transistor controls supplying of a drive current to the motor, and the second transistor controls drawing of the drive current from the motor.

3. The motor drive circuit as claimed in claim 2, wherein the first and second transistors are each formed by an NPN transistor, and the second brake control circuit lowers a base potential of said first transistor.

4. The motor drive circuit as claimed in claim 3, wherein the second brake control circuit includes:
   a switching element provided between the connection point between the first and second transistors and the motor and a base of the first transistor; and
   a control circuit that turns ON said switching element in accordance with the brake operation instruction signal.

5. The motor drive circuit as claimed in claim 2, wherein the second brake control circuit includes:
   a switching element provided between the connection point between the first and second transistors and the motor and a base of the first transistor; and
   a control circuit that turns ON said switching element in accordance with the brake operation instruction signal.

6. The motor drive circuit as claimed in claim 1, wherein the first and second transistors are each formed by an NPN transistor, and the second brake control circuit lowers a base potential of said first transistor.

7. The motor drive circuit as claimed in claim 6, wherein the second brake control circuit includes:
   a switching element provided between the connection point between the first and second transistors and the motor and a base of the first transistor; and
   a control circuit that turns ON said switching element in accordance with the brake operation instruction signal.

8. The motor drive circuit as claimed in claim 1, wherein the second brake control circuit includes:
   a switching element provided between the connection point between the first and second transistors and the motor and a base of the first transistor; and
   control circuit that turns ON said switching element in accordance with the brake operation instruction signal.

9. A motor drive method applied to a motor drive circuit in which a motor is connected to a connection point between a first transistor and a second transistor, and an emitter of said first transistor and a collector of said second transistor are connected in series, said motor drive method comprising:
   turning OFF said first transistor and turning ON said second transistor by a first brake control circuit in accordance with a brake operation instruction signal, and simultaneously forcing said first transistor to be turned OFF by a second brake control circuit independent of the operation of said first brake control circuit and before said first transistor is turned OFF by said first brake control circuit in accordance with the brake operation signal wherein the step of forcing the first transistor to be turned OFF is performed by turning ON a switching element that is provided between the connection point between the first and second transistors and the motor and a base of the first transistor in accordance with the brake operation instruction signal.

10. The motor drive method as claimed in claim 9, wherein the first transistor controls supplying of a drive current to the motor, and the second transistor controls drawing of the drive current from the motor.

11. The motor drive method as claimed in claim 10, wherein the first and second transistors are each formed by an NPN transistor, and the step of forcing the first transistor to be turned OFF is performed by lowering a base potential of the first transistor.

12. The motor drive method as claimed in claim 9, wherein the first and second transistors are each formed by an NPN transistor, and the step of forcing the first transistor to be turned OFF is performed by lowering a base potential of the first transistor.

* * * * *